United States Patent [19]

Robertson

[11] Patent Number: 4,546,154

[45] Date of Patent: Oct. 8, 1985

[54] PROCESS FOR FORMING MOLD RELEASABLE POLYURETHANE, POLYUREA AND POLYUREAURETHANE RESINS USING ISOCYANATE REACTIVE POLYSILOXANES AS INTERNAL MOLD RELEASE AGENTS

[75] Inventor: John R. Robertson, Glenn Mills, Pa.

[73] Assignee: ICI Americas Inc., Wilmington, Del.

[21] Appl. No.: 497,036

[22] Filed: May 23, 1983

[51] Int. Cl.$^4$ .................. B29F 1/00; B29D 27/00
[52] U.S. Cl. .................... 525/474; 264/45.3; 264/51; 264/328.6; 264/338; 264/DIG. 83; 521/110; 521/137; 521/154; 528/28
[58] Field of Search ............ 264/300, 328.6, 338, 264/45.3, 51, DIG. 83; 525/474; 528/28; 521/110, 137, 154

[56] References Cited

U.S. PATENT DOCUMENTS

| | | | |
|---|---|---|---|
| 3,097,176 | 7/1963 | Bender et al. ............... | 260/2.5 |
| 3,178,490 | 4/1965 | Petrino et al. ............... | 264/41 |
| 3,194,770 | 7/1965 | Hostettler ................... | 252/431 |
| 3,194,773 | 7/1965 | Hostettler ................... | 260/2.5 |
| 3,202,620 | 8/1965 | Merten et al. ............... | 260/2.5 |
| 3,373,122 | 3/1968 | Porter et al. ................ | 260/2.5 |
| 3,397,158 | 8/1968 | Britain et al. ............... | 260/2.5 |
| 3,476,933 | 11/1969 | Mendelsohn .................. | 260/2.5 |
| 3,505,377 | 4/1970 | Morehouse .................. | 260/448.2 |
| 3,579,471 | 5/1971 | Dijkhuizen ................... | 260/2.5 |
| 3,632,557 | 1/1972 | Brode et al. ................. | 260/77.5 TN |
| 3,703,489 | 11/1972 | Morehouse ................... | 260/2.5 AH |
| 3,718,613 | 2/1973 | Conger et al. ................ | 260/2.5 BD |
| 3,879,433 | 4/1975 | Omietanski et al. ........... | 260/448.2 |
| 3,933,756 | 1/1976 | Wagner ....................... | 260/75 NE |
| 3,941,733 | 3/1976 | Chang ......................... | 260/29.2 TN |
| 3,954,824 | 5/1976 | Prokel et al. ................ | 260/448.8 |
| 3,979,344 | 9/1976 | Bryant et al. ................ | 260/18 TN |
| 3,980,688 | 9/1976 | Litteral et al. ............... | 260/448.8 |
| 4,033,912 | 7/1977 | Kleimann et al. ............. | 260/2.5 AH |
| 4,052,495 | 10/1977 | Uhlmann ...................... | 264/216 |
| 4,071,483 | 1/1978 | Litteral et al. ............... | 260/2.5 |
| 4,076,695 | 2/1978 | Keil ............................ | 260/77.5 |
| 4,092,275 | 5/1978 | Reischl et al. ................ | 260/205 |
| 4,111,861 | 9/1978 | Godlewski ................... | 521/123 |
| 4,220,727 | 9/1980 | Godlewski ................... | 521/110 |
| 4,242,467 | 12/1980 | Zimmerman ................. | 521/129 |
| 4,254,228 | 3/1981 | Kleimann et al. ............. | 521/128 |
| 4,330,447 | 5/1982 | Lundberg et al. ............. | 524/269 |
| 4,331,555 | 5/1982 | Baskent et al. ............... | 252/351 |
| 4,336,358 | 6/1982 | Alberts et al. ................ | 525/439 |
| 4,345,053 | 8/1982 | Rizk et al. ................... | 525/440 |
| 4,348,510 | 9/1982 | Keck et al. ................... | 528/26 |
| 4,350,777 | 9/1982 | Henrichs et al. .............. | 521/110 |
| 4,355,062 | 10/1982 | Wang et al. .................. | 428/64 |
| 4,355,171 | 10/1982 | Montigny et al. ............. | 556/446 |
| 4,367,291 | 1/1983 | Baskent et al. ............... | 521/112 |
| 4,369,268 | 1/1983 | Graziano et al. .............. | 523/435 |
| 4,369,300 | 1/1983 | Carter et al. ................. | 528/28 |
| 4,378,389 | 3/1983 | Maruyama et al. ............ | 428/387 |
| 4,379,100 | 4/1983 | Salisbury et al. ............. | 264/39 |

FOREIGN PATENT DOCUMENTS 3012126 10/1981 Fed. Rep. of Germany .

Primary Examiner—Philip Anderson

[57] ABSTRACT

Polyurethane, polyurea and polyureaurethane resins having improved mold release properties are made by including with the reactive ingredients certain internal mold release agents which are polysiloxane polymers having pendant organic groups which contain at least one hydroxyl, amino or mercapto group.

18 Claims, No Drawings

PROCESS FOR FORMING MOLD RELEASABLE POLYURETHANE, POLYUREA AND POLYUREAURETHANE RESINS USING ISOCYANATE REACTIVE POLYSILOXANES AS INTERNAL MOLD RELEASE AGENTS

The invention is directed to polyurethane, polyurea and polyureaurethane resins having improved mold release properties. Specifically, it is directed to a process for forming mold releasable resins by reacting liquid polyisocyanates, polyols, polyamines and polyolamines having incorporated therewith certain polysiloxane derivatives having hydroxy, amino or mercapto functional side chains as internal release agents. In using the process of the invention resin articles not only have improved mold release properties but also offer better paint adhesion because the internal mold release agents remain substantially uniformly distributed throughout the fully cured resin and do not concentrate at a surface. The process of the invention is especially useful in manufacturing shaped resin components by their reaction injection molding process (RIM) wherein a liquid stream of polyisocyanate is impingement mixed with at least one other stream containing active hydrogen containing organic liquids, catalysts, fillers and the mold release agents of the invention into a heated metal mold to cure.

Recent developments in the chemistry of the polymer systems have resulted in urethane and urethane-urea polymers which are sufficiently cured to be demolded within 20-30 seconds after injection. RIM equipment has improved so that the mechanics of opening and closing the mold also require only 30-40 seconds. Urethane polymers are excellent adhesives and bond tenaciously to metal so it is necessary to apply a release agent to the mold surface so that the parts can be easily and quickly removed without damage or distortion. The molds are complex and must be completely and uniformly covered, usually by spraying a solution or emulsion of soap or wax. This procedure requires 30-60 seconds and must be done at least after every 3-5 parts and more often after each part, thus increasing the part to part cycle time by as much as 50%. In addition, this constant spraying and respraying causes excessive mold release to build up on the areas immediately surrounding the mold surface and on areas where release is relatively easy, so that some release agent is left on the mold surface, as well as areas where excess release agent is inadvertently applied excessive release agent builds up on the mold surface causing "scumming" and loss of gloss of the molded part. This means that periodically the mold must be wiped off, to remove excess release agent and, about once every 150 to 200 parts, must be completely cleaned, by solvent or detergent wash, wiped down, and the surface reprepared for molding. This can consume more than one hour per shift and thus add another 20 seconds or 10-20% of the time required to mold each part. Furthermore, the external release agent is, obviously, removed from the mold because it adheres to the molded part and must be washed off the part before it is painted, thus providing a possible source for part quality problems.

Clearly, the elimination or reduction of the need to apply external release agent could reduce the present cycle time by 50% or more, thus increasing productivity and reducing unit cost. In addition, it would reduce quality problems by reducing surface blemishes resulting from build up of release agent on the mold and by reducing paint rejects by reducing the amount of external release agent left on the surface of each part.

While the internal mold release agent dispersions of this invention can provide easy removal from an untreated mold surface at least for several parts, more efficient operation can be achieved by treating the mold surface with a standard release agent first and then again after about 10 to about 50 parts, depending on the urethane polymer in which it is employed as well as the part complexity, are made. The external agent is then reapplied and 10 to about 50 parts are again made, and so forth. The cycle time per part is thus dramatically reduced and, since less frequent applications of external release agent is required, the frequency of minor and major mold cleaning is also markedly decreased. In addition quality problems due to build up of release agent on the mold and transfer of release agent to the part are reduced. Thus the total production of quality parts during a given time period is again increased.

In the operation of a reaction injection molding process multiple streams of reactants are metered into an impingement mixer and immediately injected into a mold. For example a blend of isocyanate reactive ingredient such as polyols, polyolamines, polyamines including catalysts, fillers, dyes, coloring agents are metered as one stream ("B Component") and impingement mixed with a polyisocyanate as a second stream ("A Component") and are thereafter injected into the mold for curing. In some instances a third or fourth stream is required to meter into the impingement mixer an active ingredient which may prematurely react with one of the other components of the resin system. The polysiloxane mold release agents of the present invention are somewhat reactive with polyisocyanate and therefore must be added to the polyisocyanate stream shortly before it is impingement mixed with the other active ingredients. However, the mold release agents can suitably be added with the polyol stream or metered as a third stream where such equipment is available. If the reactive polyisocyanates are prematurely mixed with the polysiloxane mold release agent of this invention gelation occurs within a few hours and after a period of about 24 hours the isocyanate stream can no longer be metered due to complete gelation. Such premature gelation can be inhibited by incorporating a silicone surfactant with the polysiloxane ingredient.

It is therefore the object of the invention to provide a process for molding polyurethane, polyurea or polyureaurethane resin by the reaction injection molding process (RIM) which comprises impingement mixing of liquid polyisocyanates and certain reactive polysiloxane mold release agents with isocyanate reactive materials selected from polyols, polyamines, polyolamines and catalysts. Another object of the invention is to provide for a polyurethane, polyurea or polyureaurethane resin having reacted therewith from 1-15% by weight of a polyisocyanate reactive polysiloxane mold release agent having amino, hydroxyl or mercapto containing pendant organic groups.

These and other objects of the invention are accomplished by dispersing from 1-15% by weight based on the total reactive ingredients of certain isocyanate reactive polysiloxane mold release agents prior to their injection into a heated metal mold by the reaction injection molding process.

The process of this invention is practiced by adding to the reactive resin dispersion one or more polysiloxane mold release agents which consist essentially of 0.5–20 mol % of $R_aR'_bSiO_{[4-(a+b)]/2}$ units and from 99.5–80 mol % of $R''_cSiO_{(4-c)/2}$ units where
R is an isocyanate reactive organic radical,
(a) a has an average value of from 1–3,
R' and R'' are hydrocarbon radicals or substituted organic radicals,
(b) b has an average value of 0–2, a+b is from 1–3,
(c) c has an average value from 1 to 3, and
wherein
(d) the ratio of the total molecular weight to the total number of isocyanate reactive functional groups in the polysiloxane molecule (equivalent weight) ranges from 100–3500;
(e) the combined formula weights of all isocyanate reactive organic radicals, R do not exceed 40% of the total molecular weight of the polysiloxane mold release agent;
(f) the combined formula weights of all non-isocyanate reactive radicals, R'+R'' together do not exceed 40% of the total molecular weight of the polysiloxane mold release additive:
(g) the combined formula weights of all the organic radicals R+R'+R'' in the molecule together do not exceed 55–60% of the total molecular weight of the molecule;
(h) the polysiloxane mold release agent(s) each contain an average of at least two isocyanate reactive functional groups per molecule;
(i) at least two of the isocyanate reactive functional groups in each molecule are located on separate organic radicals, R, attached independently to different silicon atoms in the polysiloxane molecule;
(j) the isocyanate reactive functional groups which may be employed in the polysiloxane molecule(s) are restricted to the following types:
  (1) alcohols,
  (2) phenols,
  (3) thiols,
  (4) primary or secondary aromatic amines, which contain no oxygen, and have not more than one nitrogen atom attached directly to, in conjugation with, or incorporated within, the aromatic ring nucleus, and
  (5) secondary aliphatic amines wherein at least one of the alkyl carbon atoms, bonded directly to the nitrogen atom, is not a primary carbon atom.
The groups may be used independently or in any combination which is consistant with conditions (a)-(f);
(k) the molecular weight of the polysiloxane mold release agent is between 1000 and 30,000, preferably 2000–15,000 and most preferred 4000–8000.
(l) the polysiloxane mold release agent is substantially insoluble in liquid polyisocyanate especially those named below at temperatures up to 25° C.

In these mold release agents the hydroxy, mercapto, or amino organic R radicals having preferably a molecular weight is the range of 100–400 can be attached to the silicon atom directly to carbon or through oxygen, nitrogen or sulfur carbon bonds. Particularly preferred R radicals are those of the formula HO—R'''—, $H_2N$—R'''—, $HNR_2'''$, HS—R'''—, wherein R''' is a divalent linking group composed of carbon and hydrogen: carbon, hydrogen and oxygen: carbon, hydrogen and sulfur: carbon, hydrogen and nitrogen; or carbon, hydrogen, oxygen and nitrogen. Specific examples of R''' include the methylene, ethylene, propylene, hexamethylene, decamethylene, —CH$_2$CH(CH$_3$)—CH$_2$—, phenylene, butyl phenylene, naphthylene, —CH$_2$CH$_2$SCH$_2$CH$_2$—, —CH$_2$CH$_2$OCH$_2$—, —CH$_2$CH$_2$—CH$_2$—O(CH$_2$—CHR'O)$_n$—, where n is 0–5 where R' is described as above or H, a preferred R group is —CH$_2$CH$_2$CH$_2$O(CH$_2$CH(CH$_3$)O)$_n$H where n=1–5 having an hydroxyl equivalent weight of 500–2000. It is preferred that the R''' linking group contains from 3–10 atoms in addition to hydrogen atoms. There can be from 1–33 functional R radicals, preferably 3–10, and from 1–3 attached to a silicon atom.

As indicated above, the R' radical can be any hydrocarbon or substituted organic radical. Illustrative of the R' radicals that can be present are alkyl radicals such as the methyl, ethyl, propyl, butyl amyl, hexyl, octyl, decyl, dodecyl, and octadecyl, and myricyl radicals, alkenyl radicals such as the vinyl, allyl, and hexenyl radicals: cycloalkyl radicals such as the cyclobutyl and cyclohexyl radicals; aryl radicals such as the phenyl, xenyl and naphthyl radicals: aralkyl radicals such as the benzyl and 2-phenylethyl radicals; alkaryl radicals such as the tolyl, xylyl and mesityl radicals; the corresponding halohydrocarbon radicals such as 3-chloropropyl, 4-bromobutyl, 3,3,3-tri-fluoropropyl, chlorocyclohexyl, bromophenyl, chlorophenyl, alpha,alpha,alphatrifluorotolyl and the dichloroxenyl radicals: the corresponding cyanohydrocarbon radicals such as 2-cyanoethyl, 3-cyanopropyl and cyanophenyl radicals: the corresponding radicals such as ether and ester hydrocarbon radicals such as —(CH$_2$)$_3$OC$_2$H$_5$, —(CH$_2$)$_3$OCH$_3$, —(CH$_2$)$_3$COOC$_2$H$_5$, and (CH$_2$)$_3$COOCH$_3$, the corresponding thioether and thioester hydrocarbon radicals such as —(CH$_2$)$_3$SC$_2$H$_5$ and —(CH$_2$)$_3$COSCH$_3$; and nitrohydrocarbon radicals such as the nitrophenyl and 3-nitropropyl radicals. It is preferred that the R' radical be an organic radical containing from 1 to 10 atoms. In the most preferred embodiment of this invention at least 90 percent of all the R' radicals are methyl radicals. There can be an average of from 0 to 2 R' radicals attached to the silicon atom, i.e., b has an average of from 0 to 2 in the above formula.

The R'' radical in the functional isocyanate reactive siloxanes of this invention can also be any hydrocarbon or substituted hydrocarbon radical. The illustrative examples given with respect to R' above are equally applicable here and are not repeated for the sake of brevity. Likewise, the preferences set forth for R' above also apply to the R'' radical. There can be from 0 to 3 R'' radicals, on the average, per silicon atom, i.e., c has an average value of from 1 to 3 in the above formula.

These polysiloxane mold release agents are made by well known techniques and are usually formed by grafting an olefin containing organic modifying group or polyoxyalkylene oxide onto a "methylhydrogen siloxane" modified polydimethylsiloxane using a platinum catalyzed hydrolisation reaction.

The functional siloxanes of the mold release agent can be either solid or liquid in form and are required to be substantially insoluble in isocyanate liquid under RIM operating conditions. In order to use a solid functional siloxane it would be necessary to dissolve, disperse or suspend the siloxane in one or more silicone surfactants. Hence it is much preferred that the functional siloxane employed be in liquid form. While the viscosity of the liquid siloxane can vary over a wide range, for example from 1 to 100,000 cs., it is generally preferred that the viscosity be in the range of from 50 to 1000 cs. Molecular weight can vary from 1000 to 30,000, preferably 2000–20,000 and most preferred 4000–8000.

The formulations of the invention include from 1-15 percent by weight of a polysiloxane such as those included in the above described definition and specifically but not limited to those in the following list having $R_aR'_bSiO_{[4-(a+b)]/2}$ units and $R''_cSiO_{[4-c]/2}$ units and wherein the value listed for (d) is the equivalent weight, (e) is the combined formula weights or reactive radicals R expressed as percent of the molecular weight, (f) is the combined formula weights of non-isocyanate reactive groups $R'+R''$ expressed as percent of the molecular weight:

"Polysiloxane I" is a hydroxy functional polysiloxane polyether copolymer internal mold release agent having the approximate formula:

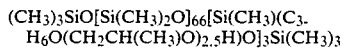

having a molecular weight of about 6000, a hydroxy equivalent weight (d) of 2000, (e) is 13%, (f) is 35%, and a viscosity of 160 centistokes "Polysiloxane II" is a hydroxy functional thioether copolymer internal mold release agent having the speculative formula:

[HOCH$_2$CH$_2$SCH$_2$CH$_2$CH$_2$(CH$_3$)$_2$SiO][Si(CH$_3$-
)$_2$O]$_{65}$[Si(CH$_3$)$_2$CH$_2$CH$_2$CH$_2$SCH$_2$CH$_2$OH]

having a hydroxy equivalent weight (d) of 2750, a molecular weight of 5500, a value for (e) of 4.7%, (f) is 37% and a viscosity of about 55 centistokes.

"Polysiloxane III" has a general formula as follows:

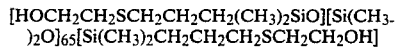

a molecular weight 13,136, (d) equivalent weight of 411, (e) is 16% and (f) is 33%.

"Polysiloxane IV" has a general formula as follows:

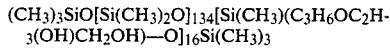

a molecular weight 6,154, (d) equivalent weight 440, (e) is 15%, and (f) is 34%.

"Polysiloxane V" has a general formula:

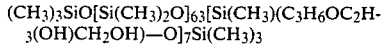

a molecular weight of 6068, (d) equivalent weight 607, (e) is 11%, and (f) is 35%.

"Polysiloxane VI" has a general formula:

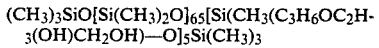

a molecular weight of 6980, (d) equivalent weight 249, (e) is 26%, and (f) is 28%.

"Polysiloxane VII" has a general formula:

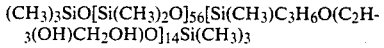

a molecular weight of 6962, (d) an equivalent weight of 3481, (e) is 3.7%, and (f) is 39%.

"Polysiloxane VIII" has a general formula:

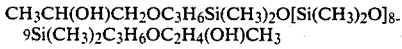

where PH=phenylene, a molecular weight of 5782, and equivalent weight (d) of 3481, (e) is 9.9% and (f) is 37%.

"Polysiloxane IX" has a general formula:

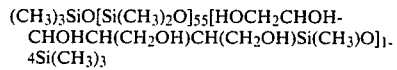

a molecular weight of 7550, an equivalent weight (d) of 108, (e) is 33% and (f) is 26%.

"Polysiloxane X" has a general formula:

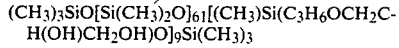

a molecular weight of 6390, an equivalent weight (d) of 355, (e) is 19% and (f) is 32%.

"Polysiloxane XI" has a general formula:

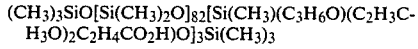

The organic polyisocyanates that are useful in producing polyurethane products in accordance with this invention are organic compounds that contain at least two isocyanate groups. Such compounds are well known in the art. The preferred polyisocyanates used in the invention are aromatic derivatives which are liquids at room temperatures. Such materials are readily commercially available such as the isomers of toluenediisocyanate, diphenylmethane diisocyanate and methylene bridged polyphenylmethane polyisocyanates isophorane diisocyanate and hydrogenated derivatives of MDI. Many of the polyphenyl polymethylene polyisocyanates which are prepared by aniline formaldehyde condensations followed by phosgenation ("crude MDI") and polyisocyanates which contain carbodiimide groups, uretonimine groups, urethane groups, sulfonate groups, isocyanurate groups, urea groups or biuret groups. Derivatives containing small amounts of prereacted low molecular weight polyols such as butylene glycol and propylene glycol or hydroxy esters to form stable liquids are useful. Such combinations are readily available and well known in the urethane manufacturing art. Of particular interest to this invention are compositions containing the 2,4' and 4,4' diphenylmethane diisocyanate isomers which are quasi prepolymers containing 1-18% by weight or about 0.1-0.3 mol percent of polyols having a molecular weight of 75-700 and especially 75-200 such as propylene glycol, butylene, and poly-1,2-propylene ether glycols having a molecular weight of from 134 to 700. Of additional interest to the invention are carbodiimide, uretonimine modified derivatives of diphenylmethane diisocyanates which have been further modified by the addition of high molecular weight polyols such as polyether diols and triols having a molecular weight of 1000-8000. In general the polyol modified isocyanate have a free —NCO content of 15-47% by weight and more often 20-30%.

Typical polyisocyanates for use in the invention are exemplified but not limited to the following:

"Polyisocyanate 1" is made by prereacting pure diphenyl-methanediisocyanate with 10% by weight of a polyol mixture containing 19 parts 1,2 propylene glycol, 22 parts 2,3 butylene glycol and 59 parts tripropylene glycol and the resultant product having 23% by weight free isocyanate commercially available as Rubinate ® 179 isocyanate from Rubicon Chem.

"Polyisocyanate 2" is uretonimine modified 4,4' diphenylmethane diisocyanate having 29.3% free —NCO and a functionality of 2.1 which is further reacted with 1.3% by weight 1,3 butylene glycol to give a free isocyanate content of 27.4%.

"Polyisocyanate 3" is similar to "Polyisocyanate 1" made by reacting 18% by weight mixed polyols to a free isocyanate content of 15%.

"Polyisocyanate 4" is similar to "Polyisocyanate 2" made by reacting a uretonimine modified polyisocyanate having a free —NCO content of 31% further reacted with 1.3% by weight 1,2 propylene glycol to a free isocyanate content of 29.3%.

"Polyisocyanate 5" is similar to "Polyisocyanate 2" made by reacting 2% by weight of 1,2 propylene glycol to a free —NCO content of 27.4%.

"Polyisocyanate 6" is similar to "Polyisocyanate 2" made by prereacting with 2% by weight tripropylene glycol.

"Polyisocyanate 7" is similar to "Polyisocyanate 2" made by prereaction with 10% by weight of the polyol mixture described in "Polyisocyanate 1" to give an —NCO content of 20%.

"Polyisocyanate 8" is similar to "Polyisocyanate 7" using 5% by weight of the polyol mixture to give an —NCO content of 24.5%.

"Polyisocyanate 9" is similar to "Polyisocyanate 2" made by prereaction with 2% by weight 1,3 butylene glycol.

The exact polyol or polyamine or mixture thereof employed as the "B" component depends upon the end use of the resin product to be produced. For example, when polyurethane foams are prepared the molecular weight or the hydroxyl number is selected to result in flexible or semiflexible foams. The polyols in this instance preferably possess a hydroxyl number of from about 50 to about 150 for semiflexible foams and from about 20 to about 70 for flexible foams. As a further example, for elastomer application would generally be desirably to utilize high molecular weight polyols having relatively low hydroxyl numbers for example 20–50 or so. Such limits are not intended to be restrictive but are merely illustrative of the large number of possible combinations of the polyol or polyols used. The relatively high molecular weight hydroxyl-containing polyols which can be employed herein are those polyether and polyester polyols which have an average hydroxyl functionality of from 2 to 6, preferably from 2 to 4 and most preferably from 2 to 3 and an average hydroxyl equivalent weight of from 500 to 5000, preferably from 1000 to 3000 and most preferably from 1500 to 2500 including mixtures thereof.

Suitable relatively high molecular weight polyether polyols which can be employed herein include those which are prepared by reacting an alkylene oxide, halogen substituted or aromatic substituted alkylene oxide or mixtures thereof with an active hydrogen-containing initiator compound.

Suitable oxides include, for example, ethylene oxide, propylene oxide, 1,2-butylene oxide, 2,3-butylene oxide, styrene oxide, epichlorohydrin, epibromohydrin, mixtures thereof and the like.

Suitable initiator compounds include water, ethylene glycol, propylene glycol, butanediol, hexanediol, glycerine, trimethylol propane, pentaerythritol, hexanetriol, sorbitol, sucrose, hydroquinone, resorcinol, catechol, bisphenols, novolac resins, phosphoric acid, mixtures thereof and the like.

Also suitable as initiators for the relatively high molecular weight polyols include, for example, ammonia, ethylenediamine, diaminopropanes, diaminobutanes, diaminopentanes, diaminohexanes, diethylenetriamine, triethylenetetramine, tetraethylenepentamine, pentaethylenehexamine, ethanolamine, aminoethylethanolamine, aniline, 2,4-toluene-diamine, 2,6-toluene-diamine, diaminodiphenyloxide (oxydianiline), 2,4'-diaminodiphenylmethane, 4,4'-diaminodiphenylmethane, 1,3-phenylenediamine, 1,4-phenylenediamine, naphthylene-1,5-diamine, triphenylmethane-4,4',4"-triamine, 4,4'-di(-methylamino)-diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane and amine aldehyde condensation products such as the polyphenyl-polymethylene polyamines produced from aniline and formaldehyde, mixtures thereof and the like.

Suitable polyester polyols which may be employed herein include, for example, those prepared by reacting a polycarboxylic acid or anhydride thereof with a polyhydric alcohol. The poly-carboxylic acids may be aliphatic, cycloaliphatic, aromatic and/or heterocyclic and may be substituted (e.g., with halogen atoms) and/or unsaturated. Example of carboxylic acids of this kind include succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids; such as oleic acid, which may be in admixture with monomeric fatty acids, terephthalic acid dimethyl ester; terephthalic acid bisglycol ester and the like. Mixtures of such acids or anhydrides may also be employed.

Examples of suitable polyhydric alcohols include ethylene glycol, 1,2-propylene glycol; 1,3-propylene glycol; 1,4-, 1,2- and 2,3-butylene glycol; 1,6-hexane diol; 1,8-octane diol; neopentyl glycol; cyclohexane dimethanol (1,4-bis-hydroxymethyl cyclohexane) 2-methyl-1,3-propane diol; glycerol; trimethylol propane; 1,2,6-hexane triol; 1,2,4-butane triol; trimethylol ethane; pentaerythritol; quinitol; mannitol; sorbitol; methyl glycoside; diethylene glycol; triethylene glycol; tetraethylene glycol; polyethylene glycol; dipropylene glycol; polypropylene glycols; dibutylene glycol; polybutylene glycols and the like. The polyesters may contain some terminal carboxyl groups. It is also possible to use polyesters of lactones such as caprolactone, or hydroxy carboxylic acids such as hydroxy caproic acid.

Other polyols which can be employed herein include polymer-containing polyols such as, for example, those disclosed in U.S. Pat. Nos. Re. 29,118 (Stamberger), 28,715 (Stamberger), 29,014 (Pizzini et al.) and U.S. Pat. No. 3,869,413 (Blankenship et al.) all of which are incorporated herein by reference.

In addition to those above-described polyols are the polymer/polyol blends which are normally liquid stable polymer/polyol compositions formed by polymerizing in the presence of a free radical catalyst from about 10 to about 50 weight percent of a mixture of an ethylenically unsaturated monomer such as acrylonitrile or styrene of mixtures thereof dissolved or dispersed in a polyol mixture.

Amine equivalents of the above described polyols and blends therewith are used in making polyurea and polyureaurethanes. Polyoxyalkylene polyamines and cyanoalkylated polyoxyalkylene polyamines having a molecular weight of 1000–10,000 with a preferred range of 2000 to 7000 which have the general formula:

$$H_2NCH_2-CXH(OCH_2CHX)_yNH_2$$

where X is H or alkyl group having 1–18 carbon atoms and where y is a number of about 20–200; and triamines of poly-alkoxylated trimethylol propane having the general formula:

$$CH_3CH_2C[CH_2(OCH_2-CHX)_zNH_2]_3$$

where z is an average of 10–100 are also useful materials for the blends of the invention. These amines are prepared according to the procedure outlined in a U.S. Pat. No. 3,666,788 the teachings of which are hereby incorporated by reference. These materials have the general formula:

$$R[(OCH_2CHX)_nOCHYCHZNHA]_m$$

where R is the nucleus of an oxyalkylation-susceptible aliphatic polyhydric alcohol containing 2–20 carbon atoms and 2–6 hydroxyl groups, A is hydrogen or a cyano or lower alkyl radical having one or two carbon atoms between the nitrogen and cyano radical provided at least one A is a cyano-lower-alkyl radical, Z is an alkyl group containing 1–18 carbon atoms, n has an average value 10–100 and m is 2–6, R is saturated and consists of carbon and hydrogen. The methyl and ethyl alkyl groups of A may be substituted by lower alkyl groups.

The blends may include lower molecular weight polyols and polyamines than those listed above.

Any known catalyst useful in producing polyurethanes may be employed. Representative catalysts includes (a) tertiary amines such as (dimethylaminoethyl)ether, triethylamine, tri-methylamine, N-methylmorpholine, N-ethylmorpholine, N,N-dimethyl-benzylamine, N,N-dimethylethanolamine, and the like; (b) tertiary phosphenes; (c) strong bases such as alkali or alkaline earth metal hydroxides and alkoxides; (d) acidic metal salts of strong acids such as ferric chloride, stannic chloride, bismuth nitrite and the like; (e) chelates of various metal such as those which can be obtained from acetylacetone, benzoylacetone, salisyl aldehydeamine and the like with various metals such as zinc, titanium, tin, iron, molybdinum and the like; (f) alcoholates of titanium, tin and aluminum and the like; (g) salts of organic acids with a variety of metal such as alkali metals, alkaline earth metals, aluminum tin, lead, maganese, cobalt, nickel, and copper including for example, sodium acetate, stannus oleate, and maganese and cobalt naphthanate and the like; (h) organo metallic derivatives of tetravalent tin, trivalent and penta-valent arsenic antamony and bismuth. Among such derivatives are most commonly used the dialkyltin salts of carboxylic acids such as dibutyltindiacetate, dibutyltindilaurate and the like.

The tertiary amines may be used as primary catalyst for accelerating the reactive hydrogen/isocyanate reaction or as secondary catalyst in combination with one or more of the above noted metal catalyst. Metal catalyst or combination of metal catalyst may also be employed as the accelerating agents without the use of the amines.

Catalyst are employed in small amounts for example, from about 0.001 percent to about 5 percent based on the weight of the reaction mixture.

In addition the polyol/polysiloxane blend may contain minor amounts of chain extenders selected from high and low molecular weights of polyamines, such as diethyltoluene diamine, thiols, and low molecular weight glycol such as ethylene glycol, butane diol, propylene glycol, and glycerine.

It may be advantageous in some instances to reduce the specific gravity of the polyol or polyamine blend by the incorporation therewith of non-reactive gases such as nitrogen, air, carbon-dioxide, and the chlorofloromethane and ethane derivatives in concentrations ranging from 1–2 percent by volume. Such gases are incorporated with polyol employing conventional mechanical mixing procedures.

Polyols and polyamines useful in preparing the polysiloxane mold release blends of the invention can be demonstrated by but not limited to those in the following list some of which are well known in the art and are readily commercially available:

"Polyol A" is a polypropylene oxide triol (the designation of this and subsequent polyols as a "triol" or "diol" represents the nominal functionality based solely on the starter used; the actual functionality will be somewhat less) having about 10 percent external ethylene oxide content, a hydroxyl number of about 48 and a number average molecular weight of about 3300.

"Polyol B" is a polypropylene oxide diol having about 15 percent external ethylene oxide content, a hydroxyl number of about 38 and a number average molecular weight of about 2800.

"Polyol C" is a polypropylene oxide triol having about 14 percent internal ethylene oxide content, a hydroxyl number of about 47 and a number average molecular weight of about 3300.

"Polyol D" is a polyol produced from propylene oxide, sorbitol and glycerine having an external ethylene oxide content of about 15 percent, a hydroxyl number of about 28 and a number average molecular weight of about 7100.

"Polyol E" is a polypropylene oxide triol having an external ethylene oxide content of about 15 percent, a hydroxyl number of about 27 and a number average molecular weight of about 4400.

"Polyol F" is a polypropylene oxide triol having an internal ethylene oxide content of about 14 percent, a hydroxyl number of about 24 and a number average molecular weight of about 5000.

"Polyol G" is a polypropylene oxide triol having an internal ethylene oxide content of about 8 percent, a hydroxyl number about 56 and a number average molecular weight of about 2800.

"Polyol H" is a polypropylene oxide triol having an internal ethylene oxide content of about 16.5 percent, a hydroxyl number of about 35 and a number average molecular weight of about 4000.

"Polyol I" is a polypropylene oxide triol having an external ethylene oxide content of about 17 percent, a hydroxyl number of about 39 and a number average molecular weight of about 4200.

"Polyol J" is a polypropylene oxide triol having an internal ethylene oxide content of about 10 percent, a hydroxyl number of about 50 and a number average molecular weight of about 3100.

"Polyol K" is a polypropylene oxide triol having an external ethylene oxide content of about 15 percent, a hydroxyl number of about 35 and a number average molecular weight of about 4000.

"Polyol L" is a polypropylene oxide triol having an external ethylene oxide cap with a 6000 M.W. and a hydroxyl value of 27.4 mg KOH/gm grafted to 20% by weight polyacrylonitrile polymer commercially available as Niax D-440 (Union Carbide).

"Polyol M" is a polypropylene oxide/polyethylene oxide triol having a molecular weight of 10,000 and a hydroxyl number of 17.

"Polyol N" is a polypropylene oxide/polyethylene oxide triol having a molecular weight of 1000 and a hydroxyl number of 150.

"Polyamine O" is a polypropylene oxide/polyethylene oxide triamine of molecular weight 3000 and is commercially available as Jeffamine T3000 (Jefferson Chem).

"Polyamine P" is a 5000 molecular weight polypropylene oxide/polyethylene oxide polyamine having total amine content of 0.48 mg/gram, 0.58 mg/gram of primary amine and commercially available Jeffamine T5000.

The polysiloxane internal mold release agent containing blends of the invention can be made by any simple mixing procedure to provide a uniform dispersion of the polysiloxane mold release agent with the polyol or polyamine blend including other ingredients such as catalysts, chain extenders, fillers, stabilizers, coloring agents, and the like which are used in conventional formulations to prepare molded articles by the reaction injection molding technique. Such polyol blends may include up to about 50 percent by weight of conventional particulate and fibers fillers and reinforcing agents in addition to dyes and pigments.

The silicone surfactants which are used as dispersing agents and inhibitors for the polysiloxane mold release agent containing polyisocyanate liquid dispersions are modified polydialkyl siloxane polymers especially polydimethylsiloxanes. These materials are well known and readily commercially available in numerous modifications having side chains linked to the silicon atoms through linking groups composed of carbon and hydrogen; carbon, hydrogen and oxygen; carbon, hydrogen and sulfur; carbon, hydrogen and nitrogen; or carbon, hydrogen, oxygen and nitrogen. Those which are substantially free of isocyanate reactivity at temperatures below 25° C. and which are completely or partly stable to moisture are preferred. For the most part these silicone surfactants are made by grafting on organic side chains which are substantially free of isocyanate reactivity.

Silicone surfactants generally conform to the general formula:

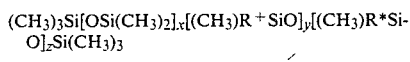

where the value of x, y or z vary from 10-1000 and where R+ and R* may be the same or different and be selected from alkyl pendant radicals such as polyalkyl ether or alkoxyether groups such as —$CH_2CHRO(CH_2$—$CHRO)_m$—$C_mH_{2m+1}$ or —$OCH_2CHRO(CH_2CHRO)_m$—$C_nH_{2n+1}$ where R is H, —CH , —$C_2H_5$ where the sum of m+n is such that the total formula weight of the polyoxyalkylene block and other grafted radicals ranges from 800-40,000, the polysiloxane block ranges from 15-70% of the molecular weight and n is 1-5; or grafted monovalent radicals selected from methoxy, ethoxy, ethylene, styrene, trifluoropropene, allyltetrahydro-furfuryl ether, allyloxyethyl acetate, acrolein diethylacetal, allylcyanide, allyloxyethyl cyanide, allylmorpholine, allyl-chloride and others.

Surfactant of particular interest for use in the invention are polydimethylsiloxane-poly (polyethylene oxide/poly-propylene oxide) block copolymers having the general formula:

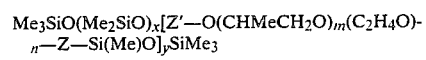

where Me=$CH_3$, x is 42-125; y is 3-15; m is 15-30; n is 10-30; and Z' is alkyl, aryl or an aralkyl radical and most often methyl; and Z is an alkylene, arylene or an aralkylene radical and most often propylene or ethylene. Preparation and use of these materials are described in U.S. Pat. Nos. 3,505,377; 3,703,489; 3,980,688; and 4,071,483 of which are hereby incorporated by reference. Similar compositions wherein the divalent Z radical is linked to silicon through an oxygen, carbonyl, acetyl, sulfur, nitrogen or carbo nitrogen group are also included.

Non-hydrolyzable surfactants are usually prepared by the platinum catalyzed addition reaction of a siloxane containing silanic hydrogens with a polyether whose chain is end blocked at one end by an alkenyloxy group (e.g., allyloxy) and at the other end by an alkoxy, aryloxy, or aralkyloxy group. Surfactants having a viscosity of at least 50 centistokes are operable and have molecular weights of 300-100,000.

Illustrative of silicone polyethylene oxide/polypropylene oxide block surfactants for use in the invention are the following:

"Silicone Surfactant A" is a polydimethylsiloxane/oxygen linked alkyl terminated polyethylene oxide/polypropylene oxide copolymer having a specific gravity of 1.03 and a viscosity of 1100 centistoked at 25° C. commercially available by Union Carbide as L550.

"Silicone Surfactant B" is a nonhydrolyzable polydimethylsiloxane-carbon linked alkyl terminated polyethylene oxide/polypropylene oxide copolymer having a specific gravity of 1.03 and viscosity of 1200 centistokes at 25° C. commercially available by Union Carbide as L540.

"Silicone Surfactant C" is a nonhydrolyzable polydimethylsiloxane-alkyl terminated polyethylene oxide/polypropylene oxide copolymer having a specific gravity of 1.03 and a viscosity of 1000-1500 centistokes commercially available by Union Carbide as L560.

"Silicone Surfactant D" is a nonhydrolyzable surfactant similar to L560 having a specific gravity of 1.03 and a viscosity of 1000-1500 commercially available by Union Carbide as L-5304.

"Silicone Surfactant E" is a polydimethyl siloxane, polyether copolymer having a specific gravity of 1.035 and viscosity of 1000-1500 and commercially available by Dow Corning as DC-190.

"Silicone Surfactant F" is a polydimethyl siloxane polyether copolymer available from B. F. Goldschmidt as BF-2270 having a viscosity of 1400 centipoise.

"Silicone Surfactant G" is a polydimethyl siloxane polyether copolymer available commercially by General Electric as SF1188.

EXAMPLE 1

1000 Parts liquid diphenylmethane diisocyanate quasi-prepolymer containing 10% low molecular weight glycols (Rubinate ® LF-179, Rubicon Inc.) was mixed with 0.1 parts polydimethylsiloxane-polyoxypropylene/polyoxyethylene block (Silicone Surfactant D) copolymer (Union Carbide Co.—silicone surfactant L-540). To this liquid was added 1 part of "Polysiloxane I". The mold release agent was added to the surfactant containing polyisocyanate liquid under high shear mixing with a Cowles high speed mixer rotating at 2430 rpm. High speed mixing is employed to obtain a fine stable dispersion. The dispersion remained stable until used in molding operations. Similar compositions made without the L-540 surfactant start to gel in less than 24 hours and were not suitable for further use.

Similar compositions made according to the procedure of Example 1 are listed in Table 1.

TABLE I

| Example No. | "Mold Release Agent Polysiloxane Type"/parts | "Silicone Surfactant Type"/parts | "Polyisocyanate Type" (100 parts) | Stability 20-25° C. (days) |
|---|---|---|---|---|
| 1 | I/1.0 | B/0.1 | 1 | >180 |
| 2 | I/3.0 | B/0.33 | " | " |
| 3 | I/3.0 | B/0.15 | " | " |
| 4 | I/6.0 | B/0.66 | " | " |
| 5 | I/6.0 | B/0.3 | " | " |
| 6 | I/12.0 | B/0.66 | " | " |
| 7 | I/15.0 | B/0.23 | " | " |
| 8 | I/6.0 | C/0.66 | " | " |
| 9 | I/6.0 | E/0.66 | " | " |
| 10 | V/6.0 | B/0.66 | " | >10 |
| 11 | IV/6.0 | B/0.66 | " | " |
| 12 | IX/6.0 | B/0.66 | " | " |
| 13 | I/5.0 | F/0.8 | 5 | " |
| 14 | I/5.0 | E/0.8 | " | >30 |
| 15 | I/5.0 | D/0.8 | " | " |
| 16 | I/5.0 | G/0.8 | " | " |
| 17 | I/5.0 | B/0.8 | " | " |
| 18 | I/5.0 | C/0.8 | " | " |
| 19 | I/5.0 | A/0.52 | " | " |
| 20 | I/5.0 | B/0.66, A/0.13 | " | " |
| 21 | I/5.0 | C/0.56 | 2 | >180 |
| 22 | I/5.0 | C/0.56 | 9 | " |
| 23 | I/5.0 | C/0.56 | 6 | " |
| 24 | III/4.5 | C/0.56 | 5 | " |
| 25 | IV/4.5 | C/0.56 | 5 | " |
| 26 | IX/4.5 | C/0.56 | 5 | " |
| 27 | I/6.0 | B/0.66 | 7 | " |
| 28 | I/6.0 | B/0.66 | 8 | " |

Indications of improved mold release are provided by laboratory techniques wherein 4 mm thick 2.54 cms×15 cms strips of conventional polyurethane RIM formulations are cast on a clean steel surface cured at 48° C. for one minute then peeled off with a metal clip attached to a spring balance. Coatings containing no mold release have release values of ranging from 800-1100 gms/in while typical RIM formulations containing from 0.5-5% by weight of the mold release agents of the invention have mold release values substantially lower. For example a RIM urethane formulation containing the blend of Example 1 gives mold release values of 200-300 gms/inch. While the laboratory peel strength is a good indication of the effectiveness of internal mold release agents their true worth can only be determined in actual commercial scale use in formulations employed in making complicated three dimensional shapes where large cured moldings must be pulled off directly from the mold surface. In the following example the use of the internal mold release blends of the invention in commercial scale RIM application is best demonstrated.

The following examples were run on a standard two component Cinncinati Milacron RIM 90 machine equipped with a heated metal mold for forming an automobile fascia having a surface area of at about 2 sq. meters and 3.68 kilograms in weight. All proportions are expressed in parts by weight unless otherwise specified.

General Procedure

The polyurethane composition used represent typical RIM two component systems where the "A" component is a composition selected from Table 1. The "B" component is a mixture of a polyether polymer polyol such as (Niax D440) with a chain extender such as ethylene glycol and dibutyl tin dilaurate (Catalyst T-12—M and T Corp.) as the catalyst.

The temperature of the "A" component is maintained at 26° C. and the "B" component at 44° C.

The polyol or "B" component is nucleated with nitrogen under pressure to result in a molded density of 1.05.

The surface of the mold is pretreated with a conventional external mold release wax, XMR-136, supplied by Chem-Trend, Inc. The mold temperature is maintained at 68° C.

Components "A" and "B" are blended in an impingement mixer and dispensed directly into the mold, the cure time is 60 seconds. The mold is then opened and the molding removed. There must be no surface sticking or tearing of the polyurethane, the part should release without the need for undue force.

EXAMPLES A-J

According to the previously described general procedure a series of automobile fascias were made employing various "A" components which are isocyanate dispersions of polysiloxanes and silicon surfactants. The "A" component of the invention were impingement mixed with typical "B" Components which are polyol blends containing catalysts and in some formulations, fillers at "A Component/B Component" ratios to provide an isocyanate index of 103-105, with a mold temperature of 68° C. with one coating of external mold release.

| "B Components" | Parts by Weight | | | | | | |
|---|---|---|---|---|---|---|---|
| | B-1 | B-2 | B-3 | B-4 | B-5 | B-6 | B-7 |
| Dow Corning Polyol XAS-10771 | 100 | 100 | | | | | |
| Union Carbide Polyol - Niax D442 | | | 81 | 53.66 | 89 | 69 | |
| Union Carbide Polyol - Niax W136 | | | | | | | 100 |
| Ethylene glycol | 16 | 16 | 19 | 12.6 | 11 | 8 | |
| Diethyltoluene diamine | | | | | | | 22.5 |
| Dibutyl Tin Dilaurate Catalyst | .09 | .09 | 00.1 | .07 | .1 | .08 | .15 |
| DABCO-DC-2 Catalyst | .09 | | 00.1 | .07 | .1 | | |
| Catalyst UL28 | | .09 | | | | | |
| Flaked Glass | | | | 33.7 | | | |
| Milled Glass | | 28.9 | | | | 23 | |

The number of molding made from various "A" Component Isocyanate Dispersions from Table 1 are listed in the following Table 2. A cure time of 60 seconds was permitted before mold was opened.

TABLE 2

| Example No. | "A" Component Isocyanate Dispersion of Example No. | "B" Component | Isocyanate Index | Ratio "A"/"B" | Number of Release before Sticking |
|---|---|---|---|---|---|
| Control | "Polyisocyanate 2" | B-1 | 103 | 0.774 | 5 |
| A | 20 | B-1 | 103 | 0.871 | >30 |
| B | 19 | B-2 | 103 | 0.66 | >30 |
| C | 20 | B-3 | 105 | 1.08 | >30 |
| D | 20 | B-5 | 104 | 0.627 | >25 |
| E | 20 | B-6 | 104 | 0.487 | >25 |
| F | 20 | B-5 | 103 | 0.667 | >25 |
| G | 20 | B-4 | 105 | 0.687 | >30 |
| H | 3 | B-7 | 105 | 0.534 | 12 |
| I | 7 | B-7 | 106 | 0.55 | 14 |
| J | 2 | B-7 | 103 | .5 | 10 |

What is claimed is:

1. In a process for preparing resins by the reaction injection molding technique which comprises the impingement mixing of liquid organic polyisocyanates with isocyanate reactive ingredients selected from the group consisting of polyols, polyamines, polyolamines and catalysts the improvement which consists of dispersing therewith from 0.5-15 percent by weight based on the total reaction mix of a polysiloxane mold release agent which consists essentially of 0.5-20 mol percent of $R_aR'_bSiO_{[4-(a+b)]/2}$ units and from 80-99.5 mol percent of $R''_cSiO_{(4-c)/2}$ units where R is an isocyanate reactive organic radical, a has an average value of from 1-3, R' and R" are both non-isocyanate reactive organic radicals, b has an average value of 0-2, a+b is from 1-3, and c has an average value of from 1-3, wherein the ratio of the total molecular weight to the total number of isocyanate reactive functional groups in the molecule ranges from 100-3500, the combined formula weights of all isocyanate reactive organic radicals, R do not exceed 40% of the total molecular weight of said polysiloxane mold release agent, the combined formula weights of all non-isocyanate reactive radicals, R'+R" together do not exceed 40% of the total molecular weight of said polysiloxane mold release additive, the combined formula weights of all the organic radicals R+R'+R" in the molecule together do not exceed 60% of the total molecular weight of the molecule, said polysiloxane mold release agent contains an average of at least two isocyanate reactive functional groups per molecule, at least two of the isocyanate reactive functional groups in each molecule are located on separate organic radicals, R, attached independently to different silicon atoms in said polysiloxane, said isocyanate reactive functional groups (R) are selected from the group consisting of alcohols, phenols, thiols, primary or secondary aromatic amines, which contain no oxygen, and not more than one nitrogen, atoms attached directly to, in conjugation with, or incorporated within, the aromatic ring nucleous, and secondary aliphatic amines wherein at least one of the alkyl carbon atoms, bonded directly to the nitrogen atom, is not a primary carbon atom and carboxylic acids, the molecular weight of said polysiloxane mold release agent ranges from 1000 and 30,000, and said polysiloxane mold release agent being substantially insoluble in said liquid polyisocyanate.

2. A process of claim 1 wherein said polysiloxane has a molecular weight of 2000-15,000.

3. A process of claim 1 wherein said polysiloxane has a molecular weight of 4000-8000.

4. A process of claim 1 wherein said polysiloxane has a viscosity of 1-100,000 centistokes.

5. A process of claim 1 wherein R, R', and R" are organic radicals attached to silicon by carbon to silicon bonds, by carbon-oxygen-silicon bonds, or by carbon-sulfur-silicon bonds.

6. A process of claim 1 wherein R is selected from the group consisting of R'''—OH, R'''—CHOHCH$_2$OH, R'''—CHOHCH$_3$, R'''—SH, R'''—CH$_2$SH, wherein R''' is a divalent linking group composed of carbon and hydrogen; carbon, hydrogen, and oxygen; carbon, hydrogen, and sulfur; or carbon, hydrogen, oxygen, and sulfur.

7. A process of claim 1 wherein R is —CH$_2$CH$_2$CH$_2$O—[CH$_2$CH(CH$_3$)O]$_n$—H where n=1-5.

8. A process of claim 7 wherein said polysiloxane has a hydroxyl equivalent weight of between 500 and 2,000.

9. A process of claim 7 wherein said polysiloxane has the general formula:

(CH$_3$)$_3$SiO[Si(CH$_3$)$_2$O]$_{66}$[Si(CH$_3$(C$_3$-H$_6$O(CH$_2$CH(CH$_3$)O)$_{2.5}$H)O]$_3$Si(CH$_3$)$_3$.

10. A process of claim 1 wherein said polysiloxane has the general formula:

(CH$_3$)$_3$SiO[Si(CH$_3$)$_2$O]$_{63}$[SiCH$_2$CH$_2$CH$_2$OCH$_2$-CHOHCH$_2$OH)(CH$_3$)O]$_7$Si(CH$_3$)$_3$.

11. A process of claim 1 wherein said polysiloxane has the general formula:

(CH$_3$)$_3$SiO[Si(CH$_3$)$_2$O]$_{65}$[SiCH$_2$CH$_2$CH$_2$OCH$_2$-CHOHCH$_2$OH)(CH$_3$)O]$_5$Si(CH$_3$)$_3$.

12. A process of claim 1 wherein said polysiloxane has the general formula:

(CH$_3$)$_3$SiO[Si(CH$_3$)$_2$O]$_{56}$[SiCH$_2$CH$_2$CH$_2$OCH$_2$-CHOHCH$_2$OH)(CH$_3$)O]$_{14}$Si(CH$_3$)$_3$.

13. A process of claim 1 wherein said polysiloxane has the general formula:

(CH$_3$)$_3$SiO[Si(CH$_3$)$_2$O]$_{134}$[SiCH$_2$CH$_2$CH$_2$OCH$_2$-CHOHCH$_2$OH)(CH$_3$)O]$_{16}$Si(CH$_3$)$_3$.

14. A process of claim 1 wherein R is CH$_2$CH$_2$SCH$_2$CN$_2$OH.

15. A process of claim 1 wherein said organic polyisocyanate is an aromatic polyisocyanate.

16. A process of claim 15 wherein said aromatic polyisocyanate is selected from the group consisting of the isomers of toluene diisocyanate, the isomers of diphenylmethane diisocyanate, and the isomers of methylene bridged diphenylmethane diisocyanate.

17. A process of claim 15 wherein said diphenylmethane diisocyanate contains minor amounts of uretonimine, carbodiimide and low molecular weight polyol modified diphenylmethane diisocyanate.

18. A fully cured resin made by the process of claim 1.

* * * * *

UNITED STATES PATENT AND TRADEMARK OFFICE
CERTIFICATE OF CORRECTION

PATENT NO. : 4,546,154

DATED : 10/8/85

INVENTOR(S) : John R. Robertson

It is certified that error appears in the above—identified patent and that said Letters Patent is hereby corrected as shown below:

Column 16, line 52, delete "$CH_2CH_2SCH_2CN_2OH'$" and insert --$CH_2CH_2SCH_2CH_2OH$--.

Signed and Sealed this

Eighth Day of July 1986

[SEAL]

Attest:

DONALD J. QUIGG

Attesting Officer

Commissioner of Patents and Trademarks